United States Patent
Drago et al.

(10) Patent No.: US 6,390,477 B1
(45) Date of Patent: May 21, 2002

(54) ROTARY SHAFT BEARING ISOLATOR SEAL

(75) Inventors: James Drago; Joel R. Shaw, both of Fairport; Larry E. Strohm, Lyons, all of NY (US)

(73) Assignee: Garlock Inc, Palmyra, NY (US)

( * ) Notice: Subject to any disclaimer, the term of this patent is extended or adjusted under 35 U.S.C. 154(b) by 0 days.

(21) Appl. No.: 09/417,686

(22) Filed: Oct. 14, 1999

(51) Int. Cl.[7] ................................................. F16J 15/34
(52) U.S. Cl. ........................ 277/358; 277/303; 277/409; 277/411; 277/412; 277/413; 277/418; 277/419; 277/421
(58) Field of Search ................................. 277/303, 409, 277/411, 412, 413, 418, 419, 421, 358

(56) References Cited

U.S. PATENT DOCUMENTS

| | | | | |
|---|---|---|---|---|
| 2,979,350 A | * | 4/1961 | Lansky | 286/26 |
| 3,368,819 A | | 2/1968 | Otto | |
| 3,893,674 A | | 7/1975 | Paradine | 277/56 |
| 4,022,479 A | | 5/1977 | Orlowski | 277/53 |
| 4,114,902 A | | 9/1978 | Orlowski | 277/53 |
| 4,175,752 A | | 11/1979 | Orlowski | 277/53 |
| 4,304,409 A | | 12/1981 | Orlowski | 277/53 |
| 4,428,586 A | | 1/1984 | Romero | 277/25 |
| 4,465,285 A | | 8/1984 | Toyoda et al. | 277/25 |
| 4,466,620 A | | 8/1984 | Orlowski | 277/53 |
| 4,572,516 A | | 2/1986 | Symons et al. | 277/50 |
| 4,572,517 A | | 2/1986 | Rockwood et al. | 277/53 |
| 4,706,968 A | | 11/1987 | Orlowski | 277/53 |
| 4,743,034 A | | 5/1988 | Kakabaker et al. | 277/53 |
| 4,817,966 A | | 4/1989 | Borowski | 277/3 |
| 4,852,890 A | | 8/1989 | Borowski | 277/25 |
| 4,890,941 A | | 1/1990 | Calafell, II et al. | 384/480 |
| 4,989,883 A | | 2/1991 | Orlowski | 277/25 |
| 5,024,451 A | | 6/1991 | Borowski | 277/53 |
| 5,431,414 A | | 7/1995 | Fedorovich et al. | 277/53 |
| 5,480,161 A | | 1/1996 | Borowski | 277/535 |
| 5,498,006 A | | 3/1996 | Orlowski | 277/53 |
| 5,735,530 A | | 4/1998 | Merkin et al. | 277/412 |
| 6,113,105 A | * | 9/2000 | Johnson | 277/412 |

FOREIGN PATENT DOCUMENTS

| | | | |
|---|---|---|---|
| DE | 41 27 300 A1 | 2/1993 | F16J/15/34 |

* cited by examiner

*Primary Examiner*—Anthony Knight
*Assistant Examiner*—Matthew E. Rodgers
(74) *Attorney, Agent, or Firm*—Cummings & Lockwood

(57) ABSTRACT

A bearing isolator seal having a shaft seal assembly that includes a stator housing comprising two components, an interior and an exterior component, the two stator housing components being selectively connectable, and axially positionable (relative to the radial faces of the rotor), disconnectable via screw threads on similar structures formed thereon to enable a perishable rotor component to be readily replaced with the stator components being reusable with a new rotor, the assembled stator housing, having an inner radially extending face with a pair of spaced concentric annular flanges of substantially frusto-conical shape extending from a larger diameter end that is fixed to the inner radially extending face to a smaller diameter free end, and a rotor having a peripherally extending radial flange that is fixed to a hub of the rotor and has a contact sealing surface that contacts the free end of the annular flanges of the stator housing. In accordance with a preferred embodiment, drain ports are provided at a radially inner side of the fixed end of a radially outermost one of the annular flanges of the stator housing, and radially extending grooves are provided in an end surface of a frusto-conical wall extending axially from the sealing face of the radial flange of rotor so as to cause lubricant to be propelled radially outwardly against the radially outermost annular flange of the stator housing, along which it is caused to flow to and through axially extending holes forming the drain ports under dynamic sealing conditions and methods for achieving desired axial clearances for both the original and the replacement rotors.

40 Claims, 4 Drawing Sheets

ROTARY SHAFT BEARING ISOLATOR SEAL

BACKGROUND OF THE INVENTION

The present application generally relates to rotary shaft seals which prevent lubricants associated with shaft bearings from leaking externally of the bearing housing or bearing support as well as for preventing foreign particles in the environment from working themselves through the seal into the lubricant, more particularly, to labyrinth and other dynamic type rotary shaft seals designed for such purposes and most particularly, to an improved rotary bearing isolator seal having two reusable/rebuildable stator components and a sacrificial/replaceable rotor component.

Typical prior labyrinth type rotary shaft seals are shown in Rockwood, et al. U.S. Pat. No. 4,572,517; and U.S. Pat. Nos. 4,022,479, 4,114,902, 4,175,752, 4,304,409, 4,706, 968, and 4,466,620, all to Orlowski. In such typical labyrinth type seals, interior labyrinth type grooves are provided in a metal seal ring which is fixed to a bearing housing. These grooves are specifically contoured to create a hydraulic dam effect that acts to remove lubricants moving axially along the shaft and pass them back into the bearing housing. Additionally, such labyrinth type seals are provided with sealing rings for preventing material from moving internally into the housing. However, a problem associated with this type of conventional seal is that there is no complete seal between the interior and exterior sides of the seal so that some material is permitted to move through the seal into the bearing housing. Furthermore, since the sealing ring wears due to the rotation of the shaft relative to the sealing ring, eventually a state is reached where sufficient foreign particles have entered the housing which leads to damage of the shaft bearings. Furthermore, labyrinth type seal designs are ineffective when shaft conditions exist such as misalignment (a condition where the center line of the shaft is displaced perpendicularly (or radially) with respect to the center line of the bore of the bearing seal) and run out of the shaft (a condition where a radial rotational eccentricity exists due to bearing wear, shaft bending or warping, etc.).

As an alternative to the labyrinth groove type seal, rotary shaft seals are known which utilize a seal member that is disposed within a seal housing and which has one or more flange-like lips biased into engagement with a wall of the seal housing. However, since the sealing member is fixed onto the periphery of the rotating shaft so as to rotate with it, high frictional forces are created at the interface between the free end of the flange-like lip and the nonrotating wall of the housing against which it is biased. Examples of such shaft seals can be found in Otto U.S. Pat. No. 3,368,819; Romero U.S. Pat. No. 4,428,586; Johnston U.S. Pat. No. 4,462,600; Toyoda, et al. U.S. Pat. No. 4,465,285; Wehrfritz, et al. U.S. Pat. No. 4,565,378; and Symons, et al. U.S. Pat. No. 4,572,516. With such seals, even if centrifugal forces are utilized to vary the contact force of the flange-like lip against the housing so as to reduce the contact force with increasing shaft speed (see, for example, the above-indicated Toyoda, et al. and Symons, et al. patents), ultimately sufficient wear occurs as to defeat the effectiveness of the seal to such an extent as to require replacement thereof. On the other hand, while it has been proposed to have a flange-like seal lip serve as a contact seal only when the shaft is stationary or rotating slowly, the lip being lifted from the housing wall against which it engages upon a predetermined increase in the rate of shaft rotation (see the above-mentioned Wehrfritz, et al. patent), such a seal has required the use of a compressed gas to lift the flange-like lip and prevent the ingress of foreign matter at higher speed conditions. Such a seal also requires a labyrinth arrangement to prevent the ingress of compressed gas into the bearing and the egress of lubricant from the bearing, at such increased shaft rotation speeds, creating a costly and complicated sealing arrangement.

Recently, Borowski disclosed in U.S. Pat. Nos. 4,852,890 and 4,817,966, the disclosure of each is herein incorporated by reference, a bearing isolator seal assembly that was simply and economically constructed, yet effectively eliminated both the movement of bearing lubricant from the seal housing and the movement of foreign particles into the bearings and lubricant from outside of the housing, and provided a relatively long wear life. However, these prior rotary shaft bearing isolator seals were designed to be replaced as a unit, i.e. both the stator components and the rotor component were replaced when the rotor component sufficiently deteriorated from wear to such on extent as to require replacement of the entire unit, both stator components and the rotor component.

While the improved bearing isolator seal assembly of Borowski has proven at least partially effective in most applications, nevertheless one of the disadvantages of such assemblies is the relatively complex configuration of the interior and exterior stator as well as the rotor and the consequent cost of the manufacturing thereof. Further, many of the prior devices, including Borowski because of the manner of interfit and cooperation between the stator and rotor, have required that at least some parts be of a split construction, thereby maintaining high manufacturing and assembling complexities and cost.

Since the rotary shaft bearing isolator seal assembly disclosed in U.S. Pat. Nos. 4,852,890 and 4,817,996 did not address the issue concerning the relatively short wear life of the rotor component as opposed to the stator components of the seal assembly, there is still a need for an improved bearing isolator seal for rotary shafts or bearing isolator seal assembly which can be simply and economically constructed, yet effectively eliminates both the movement of bearing lubricant from the seal housing and the movement of foreign particles into the bearing and lubricant outside of the housing and provides a long wear life. Further, such improved rotary shaft bearing isolator seals should include a mechanism that allows the rotor portion to be easily and accurately initially assembled into a selectively connected and disconnected two-piece stator and that provides for the easy removal and replacement of a worn rotor by a new rotor member in the original stator member upon the initial rotor member having undergone sufficient wear to reduce the seal effectiveness. Such improved rotating shaft isolator seals having replaceable rotor components reduce manufacturing, assembly and maintenance costs and reduce manufacturing, assembly and maintenance complexities.

SUMMARY OF THE INVENTION

In view of the foregoing, it is a primary objective of the present application to provide improved rotary shaft isolator seals which are simply and economically produceable and usable, while being effectively wear-free in terms of their ability to prevent lubricant leakage and foreign particle entry and include a replaceable rotor component.

It is a further object of the present application to provide an improved rotary shaft seal that includes a readily replaceable flange-like sealing element or rotor component to prevent lubricants and foreign particles from traveling through the seal under dynamic conditions, but not under static conditions.

Another object of the present application is to provide an improved rotary shaft seal structure which, under dynamic conditions, extends the life of the selectively replaceable rotor component by selectively adjusting the clearance between the rotor and the stator as the rotor component wears.

Still another object of the present application is to provide a replaceable rotary shaft bearing isolator seal including a replaceable rotor component and reusable stator components which will allow for both static and dynamic sealing at either one or both sides of the seal housing.

These and other objects of the present invention are achieved in accordance with preferred embodiments wherein an improved rotary bearing isolator seal has a shaft seal assembly comprising a two-piece, selectively removably connected stator and a selectively removable rotor operatively positioned in the selectively assembled and disassemblable stator. The two-piece, selectively connected or disconnected stator has an inner radically extending face with an annular flange of substantially frusto-conical shape that extends from a larger diameter end that is fixed to the inner radially extending face to a smaller diameter free end. The selectively replaceable rotor has a peripherally extending radial flange of substantially frusto-conical shape that is provided with a smaller diameter end that is fixed to a hub of the rotor, a larger diameter free end, and a contact sealing surface there between. The larger diameter free end is biased into contact with the inner radially extending face of the stator housing and the contact sealing surface is biased into contact with the free end of the annular flange of the stator housing in a manner causing these areas of contact to be broken under the effect of centrifugal forces generated by rotation of the rotor with the shaft.

In accordance with one embodiment, a pair of annular flanges cooperates with a pair of radial flanges which are arranged in a mirror image relationship, thereby enabling static and dynamic sealing at both sides of the seal.

In accordance with other aspects of the invention, the improved rotary isolator seal can be formed of three or four components with the stator having two parts selectively connected together with a rotor there between which can be removed from its initial position between the two stator components and can be replaced by another rotor component.

In accordance with these and further objects, one aspect of the present invention includes a rotary shaft isolator comprising: a stator having a first component and a second component; a rotor having a radial flange for engaging a surface to be sealed; and means, operatively positioned on the first and the second stator components, for operatively selectively, disconnecting and connecting the first and the second stator components such that the rotor can be initially operatively positioned between the first and the second stator components and then selectively removed from the stator and replaced by a new rotor operatively positioned between the first and the second stator components.

Another aspect of the invention involves positioning the rotor between the stator components such that their spatial relationship can be utilized to obtain any desired clearance.

Other objects, features and advantages of the invention will be apparent from the following description, the accompanying drawings and the appended claims.

DETAILED DESCRIPTION OF THE INVENTION

At the outset, it is noted that, except where specifically stated otherwise, the terms "inner" and "outer" are used with reference to the axial center line or radial center plane of the seal, as appropriate, while the terms "interior" and "exterior" are used with respect to directions inwardly toward and outwardly away from the bearings in the bearing housing to be sealed.

Figure 1:
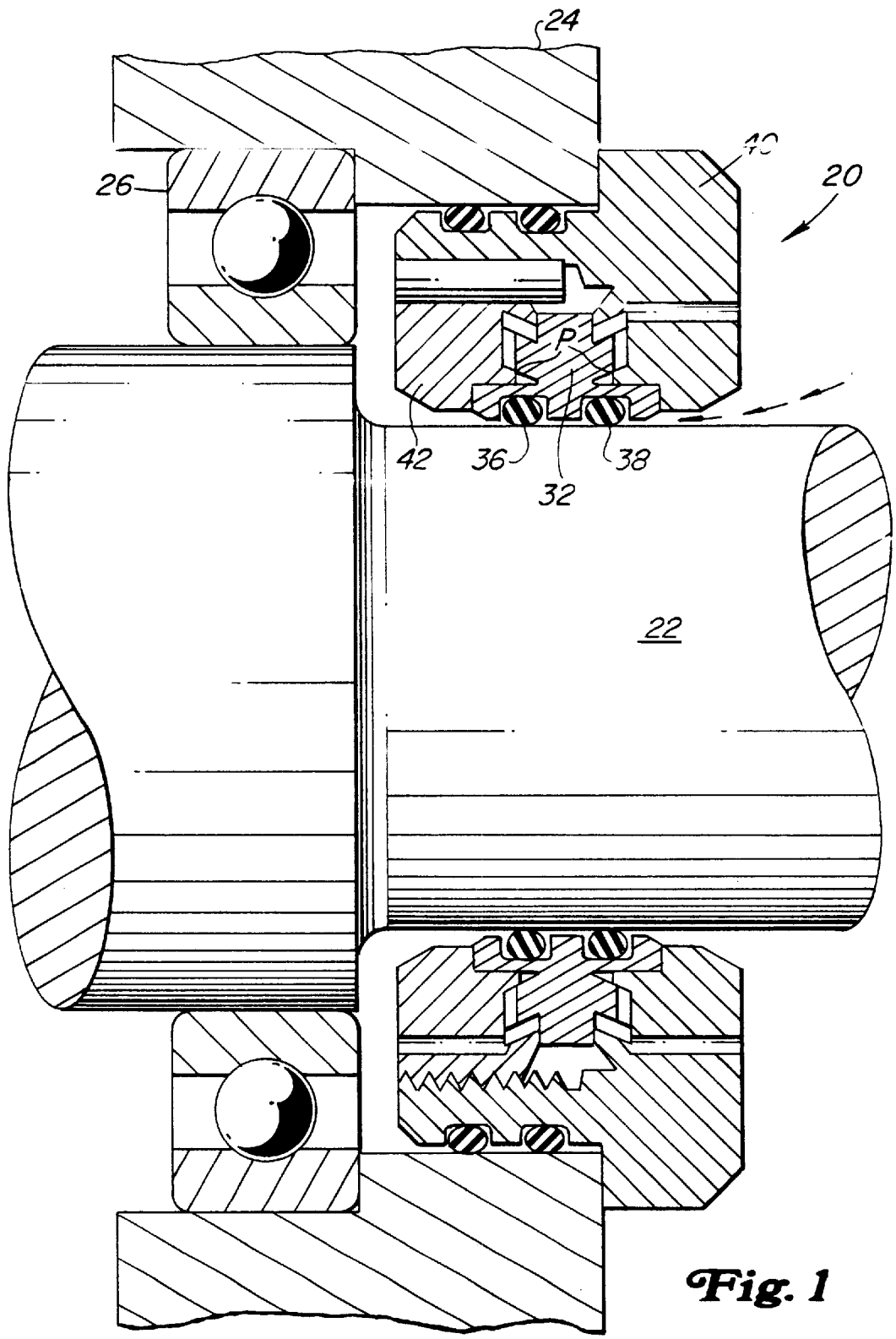
FIG. 1 is a vertical cross sectional view through a representative improved bearing isolator seal in accordance with one embodiment of the present application mounted adjacent bearing on a rotary shaft.

As shown in FIG. 1, an improved rotary shaft bearing isolator seal assembly 20, in accordance with a presently preferred embodiment of the present invention, is shown mounted on a rotary shaft 22 within a bearing housing 24 (a portion of which is shown with a wavy line). A conventional ball or tapered roller bearing 26 is shown conventionally journaled upon the shaft 22. Additionally, conventional means are provided to provide lubricant to the bearing 26.

The seal assembly 20 serves to prevent leakage of the lubricant from the interior of the housing 24 in addition to prevention of the entry of foreign particles into the bearings 26 or lubricant from the front exterior of the housing 24. Seal assembly 20 includes a stator housing 30, and a rotor 32. Stator housing 30 is operatively mounted to the bearing housing 24 via an interference/compression fit wherein the "O" rings on the non-flange portion of the stator which fits into the bore have a nominal interference fit which in effect locks the exterior stator 40 into the bore housing both rotationally and axially. Additionally, the seal assembly 20, comprised of an interior stator 42 and an outer stator 40, which coacts with the rotor 32, which is fixed for rotation on the rotary shaft 22 by way of O-ring sealing elements 36, 38. Together, these components form a unitary bearing isolator seal that has characteristics in common with the initially mentioned labyrinth and flange-like lip seals, but departs from the concepts of such seals in a way (which will become clear from the following description) that achieves static and dynamic sealing at either one or both sides of the stator seal housing 30, without the wear-associated problems and other deficiencies of such seals.

Figure 2:
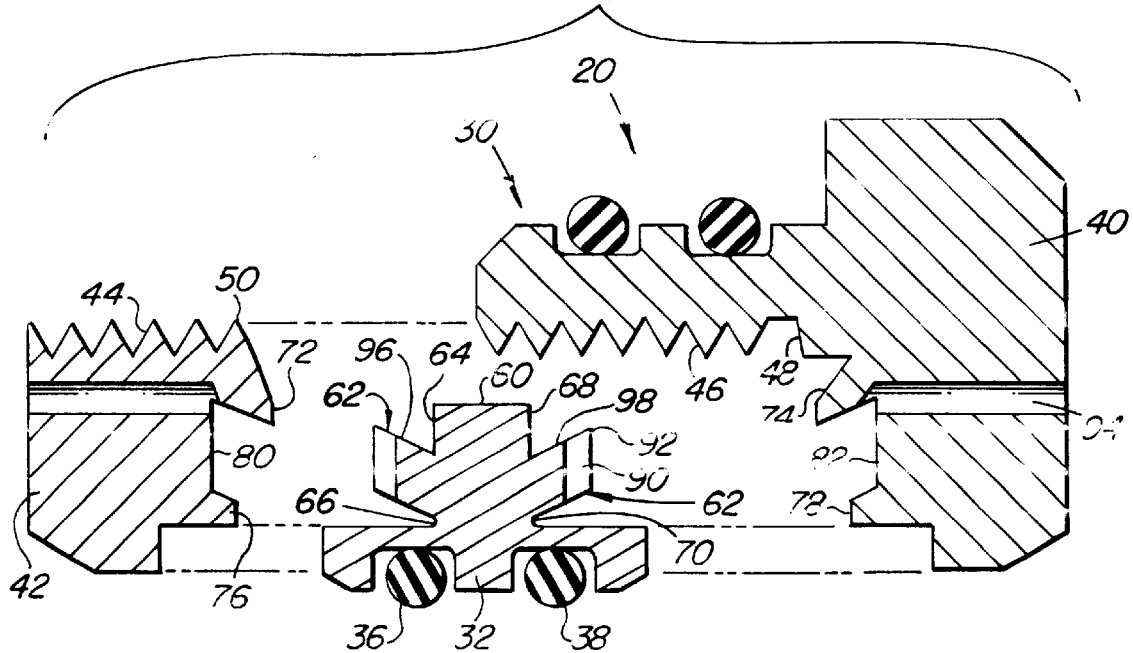
FIG. 2 is an exploded cross sectional view of the improved bearing isolator seal of FIG. 1.

Turning now to FIG. 2, it can be seen that, in accordance with this presently preferred embodiment, the sealing assembly 20 is formed of a two-piece construction comprising a stator housing 30 and a rotor 32. The stator housing 30 includes a first stator member or exterior ring 40 and a mating second stator member or interior ring 42, which are held together by connecting means or mating screw threads 44, 46 operatively formed thereon. In this regard, it is noted that the first stator member 40 has a chamfered face 48 for abutting against the corresponding beveled face 50 of the second stator member 42, and the stator members 40, 42 are rotated to produce meshing contact and compressive forces produced by the interacting mating screw threads 44, 46 sufficient to control rotation of rotor 32 relative to the stator housing 30.

As shown in FIG. 2, the rotor 32 includes a radially extending flange 60 extending axially. Preferably, the peripheral flange 60 need not be flexible, but could be flexible for certain applications. Additionally, the peripheral radial flange 60 is provided with a frusto-conical wall 62, at each of axially opposite sides thereof, which creates radially inner and outer sealing surface portions 64, 66, and 68, 70 at each of these sides. Each of the stator housing rings, 40, 42 has a first, radially outermost annular flange 72, 74 and a second, radially innermost annular flange 76, 78, respectively, extending radially and axially inwardly from a larger diameter end, that is fixed to an inner radially extending face 80, 82 of the stator housing 30, to a smaller diameter free end. These smaller diameter free ends create four contact points P (see FIG. 1), where the first annular flanges 72, 74 engage the radially outer sealing surfaces 64, 68 and where the radially inner sealing surfaces 66, 70 are approached by the free ends of the second annular flanges 76, 78, respectively.

In view of the fact that wear, at the contact points P (due to the relative rotation between the rotor 32 and stator housing 30), will create a gap of approximately 0.003–0.005 inches, static or dynamic sealing under flooded conditions cannot be expected to be achieved since there is no flexible centrifugal biasing effect as in the prior described embodiments. However, the volume of contaminants that can enter (along the path of the arrows in FIG. 1) is significantly less than would occur in some of the embodiments of the U.S. Pat. No. 4,852,890 patent, since the clearance between the stator and the rotor can be continuously adjusted. Furthermore, by the provision of pumping grooves 90 in the end surface 92 of the frusto-conical walls 62, 68, lubricant entering past the second annular flanges 76, 78 to between the rotor 32 and the radially extending faces of the stator housing 30 will be propelled toward the radially inner side of the first annular flanges 72, 74, for discharge through the drain ports 94 under dynamic sealing conditions. In this regard, the frusto-conical wall of the rotor 32 has peripherally extending surfaces 96, 98 facing each of the annular flanges, and which increase in diameter in a direction toward the drain ports 94 so that lubricant traveling along the surface 98 will be guided to the pumping grooves 90, and lubricant settling upon the peripheral surface 96, upon shutdown, will be propelled toward the drain ports 94 by centrifugal action after the rotor 32 has started up again. It is also noted that, preferably, no flexing of the frusto-conical walls 62 occurs under the effects of rotation of the rotor 32.

Figure 4:
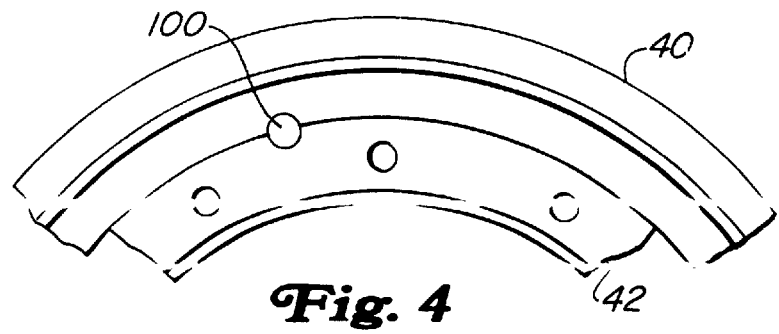
FIG. 4 is a partial plan view illustrating one alternative concept for locking these two stators together to prevent rotational movement between the exterior stator housing and the interior stator ring.

FIG. 4 illustrates one potential concept for locking the two stators together. The methods of locking the stators together are effective to prevent any rotational movement between the exterior stator member 40 and the interior stator member 42. As shown in FIG. 4, a threaded fastener 100 is illustrated. The threaded fastener 100 may be comprised of an element, such as, for example, a nominal UNC-2 threaded fastener, #10–32, which protrudes through the thread engagement area interfacing stator components 40 and 42 or a nominal size hardened and ground dowel, such as, for example, a dowel having a 3/16 inch diameter, through the thread engagement area. This type of stator locking method has been proven effective to prevent any change in the radial position of the two stator members 40, 42.

Figure 5:
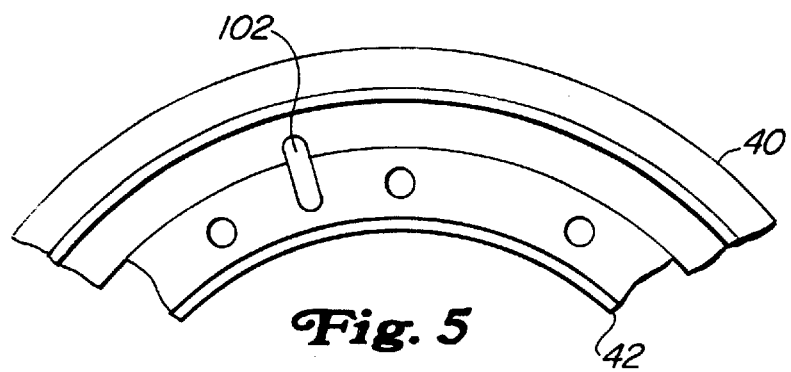
FIG. 5 is a partial plan view of another alternative stator locking concept.

An alternative stator locking method is shown in FIG. 5. The alternative method shown in FIG. 5 can be employed to ensure the radial positioning of the two stators members 40, 42 will be retained in the desired relative position. Element 102 illustrates a nominal square or flat stock key, such as, for example, a ¼ inch square or a ¼ by 3/16 inch key, positioned with the key transversing the thread engagement area to prevent any rotational travel. The keyway does encompass areas on the faces of both the interior and exterior stators 40, 42.

Figure 6:
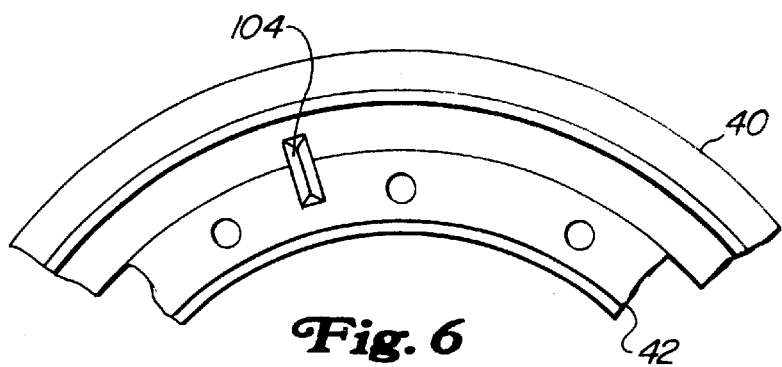
FIG. 6 is a plan view of a third alternative stator locking concept.

FIG. 6 illustrates another alternative locking method. As shown in FIG. 6 a deformed area of depression such as that formed by a cold chisel, shown as 104 is utilized to lock the stators into position. 104 represents the feature which would be struck into a malleable material, such as, for example, steel, by the displacement and deformation of material in the adjacent area. The distorted threads involved would then prevent any alteration of the radial relationships between the two stator members 40, 42.

Figure 7:
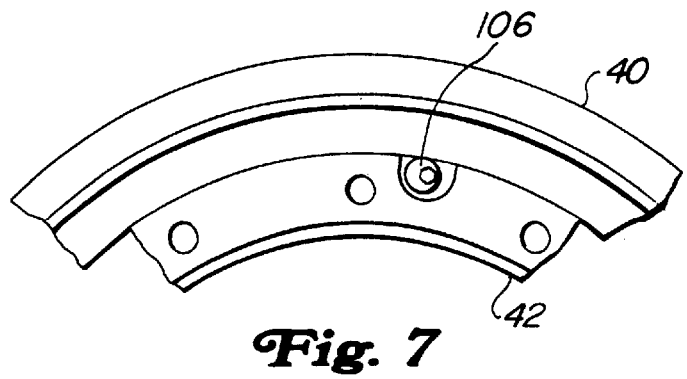
FIG. 7 is a plan view of one presently preferred stator locking concept.

FIG. 7 illustrates the presently preferred method of locking the stator members together. As shown in FIG. 7, a locking cam 106 is formed therein for preventing the alteration of the radial relationship between the two stator members 40, 42. As shown, the presently preferred stator locking method comprises a socket head cap screw with an offset head operatively positioned in the interior stator member 42. By turning the offset screw head rotationally about the threaded axis, a clamping force is generated when the offset screw head contacts the exterior stator 40, thereby locking the interior stator 42 and the exterior stator 40 with regard to rotational orientation.

The locking methods illustrated in the above Figures represent potential alternative locking methods presently believed effective to accomplish the objective of the present application and, as such, are merely representative of a plurality of possible locking methods. Therefore, it would be understood by those skilled in the art, that such alternative locking methods illustrated are not comprehensive and that numerous other alternative methods could be used by those skilled in the art and such are believed incorporated in the present application.

Figure 8:
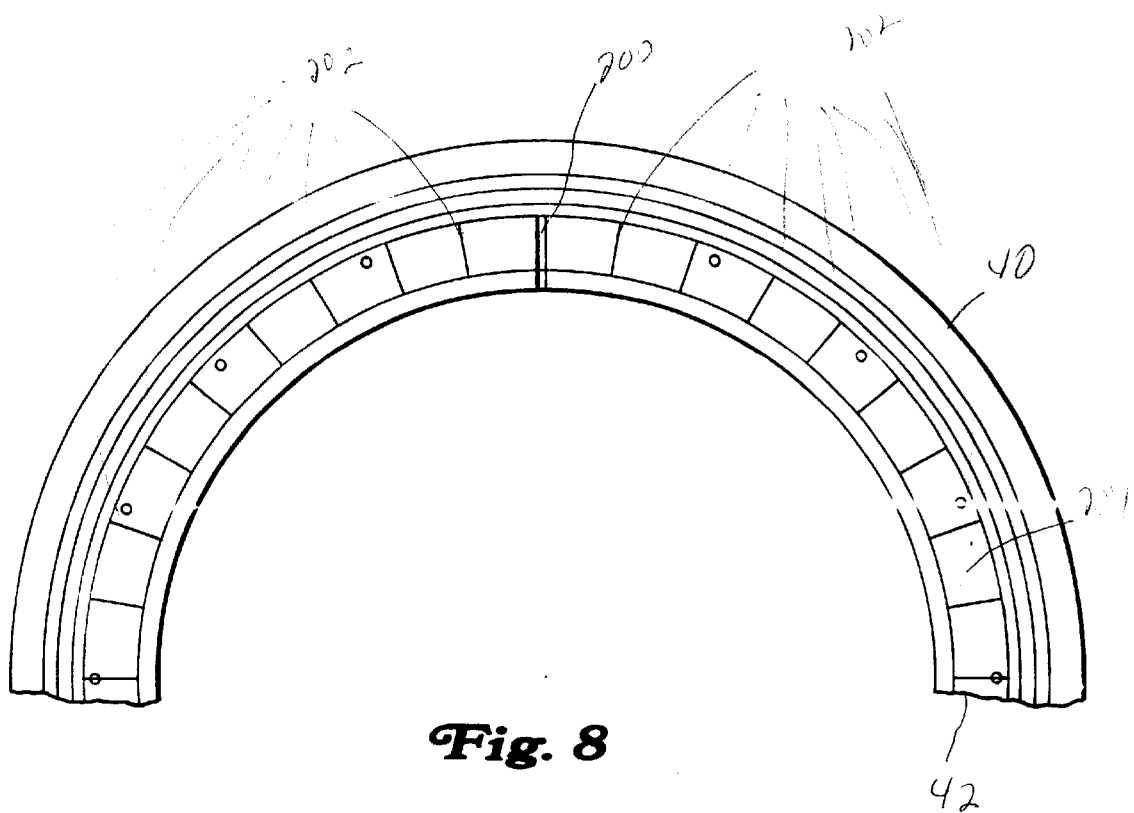
FIG. 8 is a plan view of one, presently preferred, stator locking concept and illustrating one, presently preferred, mechanism for adjusting for rotor wear.
Figure 8:
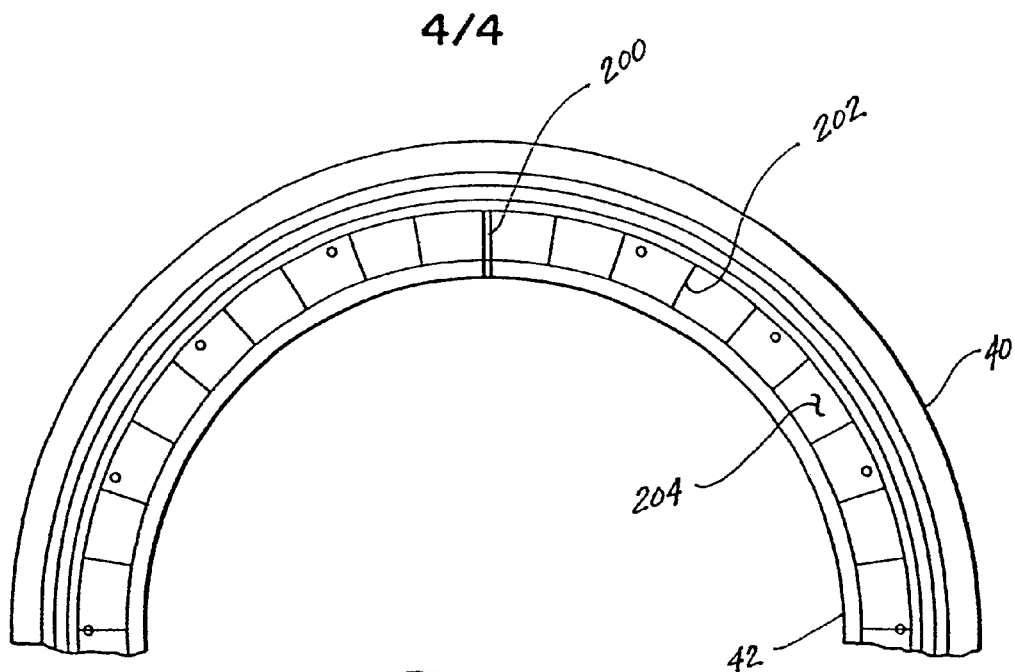

Referring now to FIG. 8, one, presently preferred, mechanism for adjusting the improved isolator seal to compensate for rotor wear is illustrated. As shown, a primary line or "master mark" 200 is positioned exactly one hundred eighty degrees (180°) opposite of the locking cam 106. The master mark 200 is machined into the innermost faces of the internal stator 42 and external stator 40, respectively. The master mark 200 should be thick, about 0.030" nominal, for example, and about 0.015" nominally deep, for example. The master mark is used to indicate the "zero" position.

The "secondary marks" or lines 202 are machined into the innermost face 204 of the internal stator 42 only. The lines 202 are thinner, about 0.015" nominal, for example, relative to the master mark 200 and about 0.015" nominally deep. This difference in physical size helps denote their secondary status as opposed to the master mark 200.

The secondary marks 202 are positioned on the surface of the innermost face 204 of the internal stator 42 at about five degree (5°) radial intervals, each radial segment mark indicating about 0.00086" of axial movement. Therefore, in this manner, ten degrees (10°) or two secondary marks would indicate about 0.0017" of axial movement, forty five degrees (45°) or nine secondary marks would indicate about 0.0078" of axial movement, etc.

One method or mechanism for adjusting for rotor wear follows:

First, the "cam lock" screw 106, see FIG. 7, is loosed sufficiently so that the internal stator 42 could be rotated in a clockwise manner about a shaft axis (not shown).

Second, the internal stator 42 is rotated in a clockwise direction axially, facing the full land of the internal stator 42, until there is contact or "zero" clearance between the parts, stators 40, 42.

Third, back-off the internal stator 42 from the "zero" clearance position by rotating the internal stator 42 in a counter-clockwise direction axially, such as, for example, for six-marks.

When the primary line 200 on the internal stator 42 exactly coincides with the secondary line 202 on the external stator 40, as in a vernier type of application, the desired clearance setting is achieved.

The previous example would move the interior stator 42 about thirty degrees (30-degrees) rotationally, while spatially along the axis, it would have moved about 0.0052", thus providing about 0.0026" of clearance per side (nominal) with the mating rotor and stator faces.

Finally, while holding the rotatable stator members in position, the "cam lock" fastener is tightened until the stators are secured and the rotor is secured in position therebetween.

As the internal stator 42 was rotated in a clockwise manner about a shaft axis (not shown) when viewed from inside of the housing, this would be an indicator of the wear occurring.

As can be seen, the following are the differences between the seal shown in FIG. 10 of the U.S. Pat. No. 4,852,890 patent and the seal of the present application:

1) Part (10"") metal mounting shell shown in FIG. 10 of the '890 patent is no longer needed to strengthen the components. The screw-together concept of the stator members, as described in the present application is simpler, less complex, and uses fewer parts.

2) Frictional wear at contact points "P" shown in FIG. 10 of the '890 patent between the rotor (15"") and stationary interior stator housing (5""), as well as stationary exterior stator (16"") can be compensated for by the rotation of the external stator 40 in the present application.

3) The center rotor of FIG. 10 (Part 15"") is now a sacrificial wear member in addition to being replaceable. This is believed to be a unique original feature not available in the market and certainly not encompassed by any other previous known prior patents involving bearing isolator seals.

4) In the '890 patent, the aspect of materials was not addressed. The interior and exterior stators 40, 42 of the present application are of a higher hardness (e.g., Rockwell value of Rockwell B or C scale for metallic stators) and conversely the rotor is of a softer material (e.g. Shore A through Shore D value), wherein, for example, a common pocket comb would be the 50/60 Shore "D" range, etc.

In the present application, clearances can be set by the rotation about the shaft axis of the interior stator 42 until the stator bottoms out by pushing the rotor 32 into the exterior stator 40. At this point, we have "zero" clearance. A desired clearance can be obtained by then rotating the aforementioned interior stator 42 in a counter-clockwise (ccw) direction whereby a forty-five (45°) degree ccw rotation will yield about a 0.0078 inch of axial movement (clearance), about ninety (90°) degree ccw rotation would yield about a 0.0156 inch of axial movement, etc., up to three hundred sixty (360°) degrees ccw rotation which would yield about a 0.0625 inch axial movement (clearance).

5) The previous system of the '890 did not have any provision for adjusting (compensating) for the frictional wear as described in item #2 above. In the seal of the present application, this adjustment can be accomplished through the radial rotation of the exterior stator 40 about the axial centerline of the shaft 22 (e.g., rotate within the stator housing 30 while mounted on the shaft). No removal required. This allows for wear adjustment in the axial direction. In the occurrence of inevitable wear, the rotational locking device (be it fastener, dowel, key or other equivalent device known to those skilled in the art) between the interior and exterior stators can be removed and the interior stator adjusted inward axially to compensate for wear. The angle of rotation will be dependent on the wear experienced. At this juncture, any previous provisions for locking after adjustment (e.g., key slot, fastener locking cam or dowel hole) are to be adjusted and applied.

6) As a result of the adjustment/compensation feature, clearances as well as pumping flow rates can be influenced with the speed of flow being greater when there is a constriction in cross-sectional area, meaning a tighter clearance.

7) The major components of the stationary interior stator 42 and the adjustable exterior stator 40 are reusable/rebuildable. The rotor 32 is a perishable commodity which can be replaced. Again, no other previous patent involving bearing isolator seals is known to disclose this advantage.

While the articles and methods described herein constitute preferred embodiments of the invention, it is to be understood that the invention is not limited to these precise articles and methods and that changes may be made therein without departing from the scope of the invention which is defined in the appended claims.

What is claimed is:

1. A rotary shaft bearing isolator seal comprising:
   a stator housing having a first member and a second member;
   a rotor having a radial flange for engaging a surface to be sealed; and
   means, operatively positioned on the first and the second stator members, for operatively selectively, disconnecting and connecting the first and the second stator members such that the rotor can be initially operatively positioned between the first and the second stator members and then selectively removed from between the stator members and replaced by a new rotor operatively positioned between the first and the second stator members, wherein the replacement rotor will be positioned having a desired clearance and the means for operatively selectively disconnecting and connecting the first and second stator members allows for the selective and continual adjustment of the desired clearance between the replacement rotor and the first and second stator members.

2. The seal of claim 1, wherein the stator housing disconnecting and connecting means comprises:
   complementary screw threads operatively formed on the first and the second stator members.

3. The seal of claim 1, wherein a frusto-conical wall of the rotor has a peripherally extending surface facing annular flanges which are operatively associated with the first and second stator members, the peripherally extending surface increasing in diameter in a direction toward at least one drain port.

4. The seal of claim 1, wherein annular flanges are provided on the first stator member having a peripheral wall; and wherein the second stator member, in the form of an annular disc, is threadedly connected to an inner surface of the peripheral wall of the first stator member.

5. The seal of claim 4, wherein the stator housing has a first and a second said inner radially extending face in an opposed relationship to each other, and upon each of which a first and a second annular flange is provided, respectively; wherein the at least one drain port is provided in proximity with each first annular flange; and where the rotor is provided with a frusto-conical wall with pumping grooves on each of opposite sides of the rotor.

6. The seal of claim 1, wherein the rotor is operatively positioned between the stator members such that their spatial relationship can be utilized to obtain any desired clearance within the range of about a 0.0078 inch of axial clearance, to about a 0.0625 inch axial clearance.

7. A bearing isolator seal having a shaft seal assembly comprising:
    a perishable rotor having radial faces; and
    a stator housing comprising two components, an interior and an exterior member, the two stator members being selectively connectable and selectively axially positionable relative to the radial faces of the rotor to allow for selective and continual adjustment of the two components, and selectively disconnectable therefrom such that the perishable rotor can be readily replaced, with the stator members being reusable with a new perishable rotor, the assembled stator, having an inner radially extending face with a pair of spaced concentric annular flanges of substantially frusto-conical shape extending from a larger diameter end that is fixed to the inner radially extending face to a smaller diameter free end, and a rotor having a peripherally extending radial flange that is fixed to a hub of the perishable rotor and has a contact sealing surface that contacts the free end of the annular flanges of the stator.

8. The seal of claim 7, wherein the operatively selectively, disconnecting and connecting means comprises:
    complementary screw threads operatively formed on the first and the second stator members.

9. The seal of claim 7 wherein the rotor is operatively positioned between the stator members such that their spatial relationship can be utilized to obtain any desired clearance within the range of about a 0.0078 inch of axial clearance, to about a 0.0625 inch axial clearance.

10. A method of setting clearances in a bearing isolator seal having a shaft seal assembly, the seal comprising:
    a stator having a first member and a second member;
    a rotor having a radial flange for engaging a surface to be sealed; and
    means, operatively positioned on the first and the second stator members, for operatively selectively disconnecting and connecting the first and the second stator members such that the rotor can be initially operatively positioned between the first and the second stator members and then selectively removed from the stator and replaced by a new rotor operatively positioned between the first and the second stator members, wherein the method comprises the steps of:
        rotating the interior stator member about the shaft axis until the stator bottoms out by pushing the rotor into the exterior stator, for a condition of "zero" clearance; and
        rotating the interior stator in a counter-clockwise direction from about a forty-five (45°) degree counter-clockwise rotation up to about a three hundred sixty (360°) degree counter-clockwise rotation, yielding from about a 0.0078 inch of axial clearance, to about a 0.0625 inch axial clearance.

11. The method of claim 10 further comprising the step of:
    securing the first and second stator members in a non-rotating relationship to obtain a desired axial clearance.

12. The method of claim 10 wherein the first and second stator members are secured in a non-rotating relationship by a locking cam.

13. The method of claim 10 wherein the first and second stator members are secured in a non-rotating relationship by a key slot.

14. The method of claim 10 wherein the first and second stator members are secured in a non-rotating relationship by a fastener or dowel hole.

15. A system for setting clearances in a bearing isolator seal having a shaft seal assembly, the seal comprising:
    a stator having a first member and a second member;
    a rotor having a radial flange for engaging a surface to be sealed; and
    means, operatively positioned on the first and the second stator members, for operatively selectively, disconnecting and connecting the first and the second stator members such that the rotor can be initially operatively positioned between the first and the second stator members and then selectively removed from the stator and replaced by a new rotor operatively positioned between the first and the second stator members, wherein the system comprises:
        means for rotating the interior stator member about the shaft axis until the stator bottoms out by pushing the rotor into the exterior stator, for a condition of "zero" clearance; and
        means for rotating the interior stator in a counter-clockwise direction from about a forty-five (45°) degree counter-clockwise rotation up to about a three hundred sixty (360°) degree counter-clockwise rotation, such means yielding from about a 0.0078 inch of axial clearance, to about a 0.0625 inch axial clearance.

16. The system of claim 15 further comprising:
    means for securing the first and second stator members in a non-rotating relationship such that a desired axial clearance is obtained.

17. The system of claim 16 wherein the first and second stator members are secured in a non-rotating relationship by a locking cam.

18. The system of claim 16 wherein the first and second stator members are secured in a non-rotating relationship by a key slot.

19. The system of claim 16 wherein the first and second stator members are secured in a non-rotating relationship by a fastener or dowel hole.

20. A rotary shaft bearing isolator seal comprising:
    a stator housing having a first member and a second member;
    a rotor having a radial flange for engaging a surface to be sealed; and
    complementary screw threads operatively formed on the first and the second stator members, for operatively selectively, disconnecting and connecting the first and the second stator members such that the rotor can be initially operatively positioned between the first and the second stator members and then selectively removed from between the stator members and replaced by a new rotor operatively positioned between the first and the second stator members wherein the replacement rotor will be positioned having a desired clearance.

21. The seal of claim 20, wherein a frusto-conical wall of the rotor has a peripherally extending surface facing annular flanges which are operatively associated with the first and second stator members, the peripherally extending surface increasing in diameter in a direction toward at least one drain port.

22. The seal of claim 20, wherein annular flanges are provided on the first stator member having a peripheral wall; and wherein the second stator member, in the form of an annular disc, is threadedly connected to an inner surface of the peripheral wall of the first stator member.

23. The seal of claim 22, wherein the stator housing has a first and a second inner radially extending face in an opposed relationship to each other, and upon each of which a first and a second annular flange is provided, respectively; wherein at least one drain port is provided in proximity with each first annular flange; and where the rotor is provided with a frusto-conical wall with pumping grooves on each of opposite sides of the rotor.

24. The seal of claim 20, wherein the rotor is operatively positioned between the stator members such that their spatial relationship can be utilized to obtain any desired clearance within the range of about a 0.0078 inch of axial clearance, to about a 0.0625 inch axial clearance.

25. A bearing isolator seal having a shaft seal assembly comprising:
   a perishable rotor having radial faces; and
   a stator housing comprising two components, an interior and an exterior member, the two stator members having complementary screw threads operatively formed thereon, the complementary screw threads allowing the stator members to be selectively connectable, and axially positionable relative to the radial faces of the rotor, and selectively disconnectable therefrom such that the perishable rotor can be readily replaced, with the stator members being reusable with a new perishable rotor, the assembled stator, having an inner radially extending face with a pair of spaced concentric annular flanges of substantially frusto-conical shape extending from a larger diameter end that is fixed to the inner radially extending face to a smaller diameter free end, and a rotor having a peripherally extending radial flange that is fixed to a hub of the perishable rotor and has a contact sealing surface that contacts the free end of the annular flanges of the stator.

26. The seal of claim 25 wherein the rotor is operatively positioned between the stator members such that their spatial relationship can be utilized to obtain any desired clearance within the range of about a 0.0078 inch of axial clearance, to about a 0.0625 inch axial clearance.

27. A method of setting clearances in a bearing isolator seal having a shaft seal assembly, the seal comprising:
   a stator having a first member and a second member;
   a rotor having a radial flange for engaging a surface to be sealed; and
   means, operatively positioned on the first and the second stator members, for operatively selectively adjusting a spatial relationship between the stator members and the rotor, wherein the method comprises the steps of:
      rotating the first stator member about the shaft axis until the stator bottoms out by pushing the rotor into the second stator member, for a condition of "zero" clearance; and
      rotating the first stator in a counter-clockwise direction resulting in a minimal axial clearance of about 0.0078 inch.

28. The method of claim 27 further comprising the step of:
   disconnecting and connecting the first and the second stator members such that the rotor can be initially operatively positioned between the first and the second stator members and then selectively removed from the stator and replaced by a new rotor operatively positioned between the first and the second stator members.

29. The method of claim 27 wherein the first stator member is rotated from about a forty-five (45°) degree counter-clockwise rotation up to about a three hundred sixty (360°) degree counter-clockwise rotation, yielding from about a 0.0078 inch of axial clearance, to about a 0.0625 inch axial clearance.

30. The method of claim 27 further comprising the step of:
   securing the first and second stator members in a non-rotating relationship to obtain a desired axial clearance.

31. The method of claim 30 wherein the first and second stator members are secured in a non-rotating relationship by a locking cam.

32. The method of claim 30 wherein the first and second stator members are secured in a non-rotating relationship by a key slot.

33. The method of claim 30 wherein the first and second stator members are secured in a non-rotating relationship by a fastener or dowel hole.

34. A system for setting clearances in a bearing isolator seal having a shaft seal assembly, the seal comprising:
   a stator having a first member and a second member;
   a rotor having a radial flange for engaging a surface to be sealed; and
   means, operatively positioned on the first and the second stator members, for operatively selectively adjusting the spatial relationship between the stator members and the rotor, wherein the system comprises:
      means for rotating the first stator member about the shaft axis until the stator bottoms out by pushing the rotor into the exterior stator, for a condition of "zero" clearance; and
      means for rotating the first stator member in a counter-clockwise direction resulting in a minimal axial clearance of about 0.0078 inch.

35. The system of claim 34 further comprising:
   means for disconnecting and connecting the first and the second stator members such that the rotor can be initially operatively positioned between the first and the second stator members and then selectively removed from the stator and replaced by a new rotor operatively positioned between the first and the second stator members.

36. The system of claim 34 wherein the means for rotating the interior stator in a counter-clockwise direction provides for about a forty-five (45°) degree counter-clockwise rotation up to about a three hundred sixty (360°) degree counter-clockwise rotation, such means yielding from about a 0.0078 inch of axial clearance, to about a 0.0625 inch axial clearance.

37. The system of claim 34 further comprising:
   means for securing the first and second stator members in a non-rotating relationship such that a desired axial clearance is obtained.

38. The system of claim 37 wherein the first and second stator members are secured in a non-rotating relationship by a locking cam.

39. The system of claim 37 wherein the first and second stator members are secured in a non-rotating relationship by a key slot.

40. The system of claim 37 wherein the first and second stator members are secured in a non-rotating relationship by a fastener or dowel hole.

* * * * *

UNITED STATES PATENT AND TRADEMARK OFFICE
CERTIFICATE OF CORRECTION

PATENT NO. : 6,390,477 B1
DATED : May 21, 2002
INVENTOR(S) : James Drago, Joel R. Shaw and Larry E. Strohm It is certified that error appears in the above-identified patent and that said Letters Patent is hereby corrected as shown below:

Drawings,
Replace sheets 2 and 4 with the attached sheets.

Signed and Sealed this

Fifth Day of November, 2002

Attest:

Attesting Officer

JAMES E. ROGAN
Director of the United States Patent and Trademark Office

Figure 3:
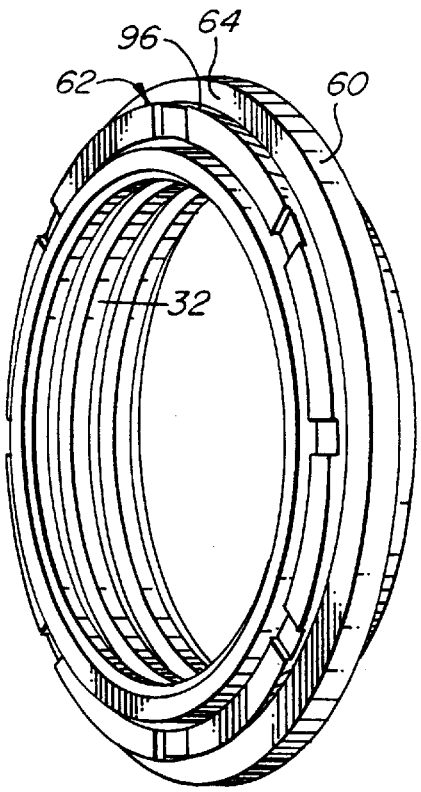
FIG. 3 is a perspective view of the improved bearing isolator seal (e. g., rotor) of FIGS. 1 and 2.

Fig. 2
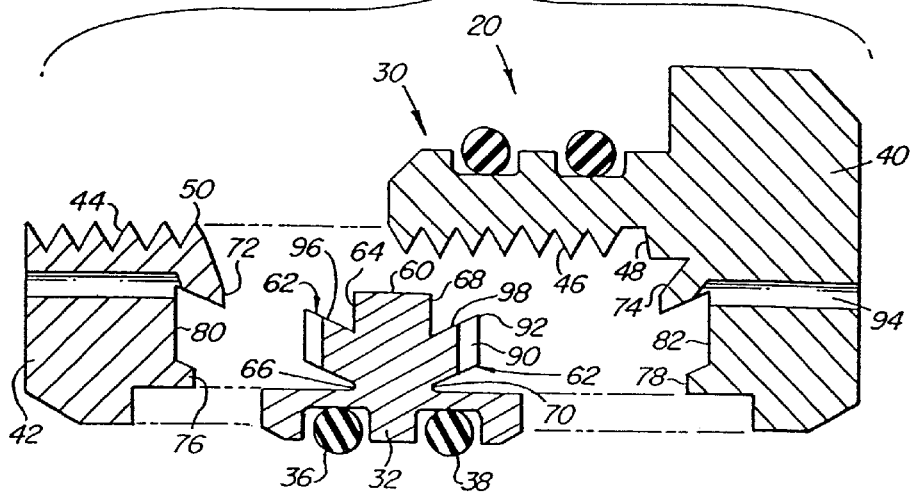
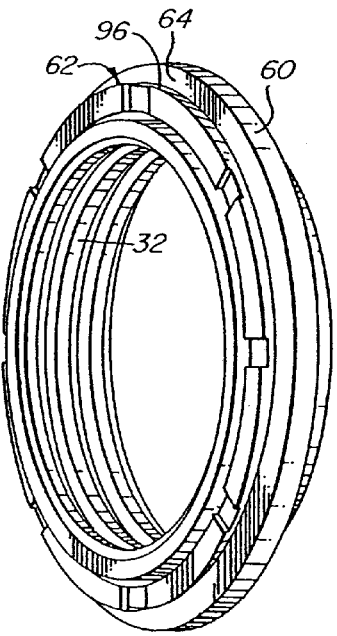
Fig. 3